US012717799B2

(12) United States Patent
Di Rosa

(10) Patent No.: US 12,717,799 B2
(45) Date of Patent: Aug. 25, 2026

(54) METHOD AND SYSTEM FOR OPTIMIZATION AND PERSONALIZATION OF SEARCH RESULTS ACCORDING TO PREFERENCES AND MANDATORY CONSTRAINTS

(71) Applicant: AI Solutions by Emanuele Di Rosa PhD, Warsaw (PL)

(72) Inventor: Emanuele Di Rosa, Tomaszkowo (PL)

(73) Assignee: AI Solutions by Emanuele Di Rosa PhD, Warsaw (PL)

( * ) Notice: Subject to any disclaimer, the term of this patent is extended or adjusted under 35 U.S.C. 154(b) by 0 days.

(21) Appl. No.: 19/086,885

(22) Filed: Mar. 21, 2025

(65) Prior Publication Data

US 2025/0298806 A1 Sep. 25, 2025

(51) Int. Cl.
*G06F 16/2457* (2019.01)
*G06F 16/901* (2019.01)
*G06F 16/908* (2019.01)

(52) U.S. Cl.
CPC .... *G06F 16/24578* (2019.01); *G06F 16/9024* (2019.01); *G06F 16/908* (2019.01)

(58) Field of Classification Search
None
See application file for complete search history.

(56) References Cited

U.S. PATENT DOCUMENTS

2013/0018900 A1* 1/2013 Cheng ................. G06F 16/9535 707/E17.014
2021/0081854 A1* 3/2021 Valverde, Jr. ....... G06F 16/9537
2021/0173841 A1* 6/2021 Kotnis ................ G06F 16/9024
2022/0148016 A1* 5/2022 Fang .................. G06Q 30/0201
2022/0214864 A1* 7/2022 Singhal ............... G06F 16/9024
2024/0290122 A1* 8/2024 Pfante .............. G06V 30/18181
2025/0278423 A1* 9/2025 Bierner ............... G06F 16/3332

FOREIGN PATENT DOCUMENTS

WO 2018/081020 A1 5/2018

OTHER PUBLICATIONS

Italian Search Report; dated Oct. 23, 2024; application # 202400006643.

* cited by examiner

*Primary Examiner* — Christopher J Raab
(74) *Attorney, Agent, or Firm* — Polsinelli PC

(57) ABSTRACT

In one aspect, a method for determining personalized search results with respect to mandatory constraints and qualitative preferences on search criteria representable via a DAG includes collecting input from users or software systems; transforming the inputs into the mandatory constraints and preferences on search criteria, wherein the search criteria is partially ordered and representable through the DAG; determining weights for the search criteria using a function, and associating the weights with the nodes of the DAG to determine a partial ordering of such weights equivalent to an order of the DAG nodes, where any node at level “k” has a weight “w” such that sum of all or any finite subset of the weights of the nodes at levels below “k” is always less than “w”, the level being defined by a topological order of the DAG; and determining search results that satisfy the mandatory constraints on the search criteria.

20 Claims, 8 Drawing Sheets

METHOD AND SYSTEM FOR OPTIMIZATION AND PERSONALIZATION OF SEARCH RESULTS ACCORDING TO PREFERENCES AND MANDATORY CONSTRAINTS

CROSS-REFERENCE TO RELATED APPLICATIONS

This application claims the benefit of priority of Italian Application No. 102024000006643, filed on Mar. 25, 2024, entitled, "METHOD AND SYSTEM FOR OPTIMIZATION AND PERSONALIZATION OF SEARCH RESULTS ACCORDING TO PREFERENCES AND MANDATORY CONSTRAINTS", which is hereby expressly incorporated herein by reference in its entirety and for all purposes.

TECHNICAL FIELD

The present disclosure primarily finds industrial application in systems for managing databases, including distributed, heterogeneous, and non-federated databases, as well as in automatic information retrieval systems (commonly referred to as search engines). It enables the querying of multiple data sources, both structured and unstructured, by introducing the concept of result optimality relative to formally specified preferences. The results are then ordered according to an optimality score based on the expressed preferences, thereby identifying optimal (and sub-optimal) solutions. This approach optimizes both response time and the memory required.

BACKGROUND

In the known art, widely used database management s stems or automatic information retrieval systems do not provide the user operator with the ability to express mandatory search constraints in natural language through free text a d, above all, neither require nor offer the possibility of collecting additional constraints, such as preferences that may be expressed in terms of a directed acyclic graph. Normally, the user is asked to fill out search forms, choose from preconfigured closed options by interacting with a mouse and keyboard, or, in the case of an operator, to write their requests using an SQL extension capable of representing preferences.

Moreover, the known art in database management systems and information retrieval systems, when introducing the concept of optimality with respect to the operator user's preferences, offers centralized systems or assumes that all admissible solutions (those satisfying the mandatory constraints) are already available at the start of the process that determines the optimal solutions or search results. In fact, they sometimes implement methods of automated reasoning with preferences based on dominance tests among the available admissible solutions (those satisfying the mandatory constraints). For example, in "Reasoning with Conditional Ceteris Paribus Preference Statements", where a solution is optimal if it is not dominated with respect to preferences by any other solution, i.e., search result in our context.

In other cases, the known art presents methods for calculating scores to associate with search results, which allow relative ranking of the results but not absolute and global ranking of search results with respect to preferences: in cases where new search results dynamically emerge, for example, because they progressively arrive from numerous systems or third-party databases, such calculation methods do not allow the computation of a score exclusively on the newly arrived search results (as in the method subject to the present disclosure), since the generated weights are not functional for an absolute ranking of results. These methods require restarting the computation from the beginning on the new "extended" set, consisting of previous search results and the newly found solutions, resulting in significant inefficiency and making them impractical for industrial applications of significant size.

In the known art, methods for calculating search results in database management systems are designed to query a single database or, in other cases, do not foresee a plurality of incremental search results progressively available (as, for example, in "Preference SQL—Design, Implementation, Experiences").

SUMMARY

Aspects of the present disclosure are directed to allowing for the progressive discovery/computation of additional solutions or search results during the calculation process, potentially from a database not available at the start of the query, and for updating the list of optimal solutions and the ranking of sub-optimal solutions without having to restart the computation from the beginning. This provides high efficiency and scalability to the method and the overall system, and also enables application in industrial context where the number of sources of search results (e.g., databases or third-party sites/systems) and the search results themselves is significantly high.

The present disclosure can be utilized in automatic information retrieval systems where augmented retrieval generation techniques are applied. By leveraging preferences-specified not only by users but also by automatic systems—it enhances both the effectiveness and efficiency of the information retrieval component (commonly referred to as the "retriever").

The present disclosure employs artificial intelligence techniques, particularly automated reasoning, combinatorial optimization with preferences, and optionally, artificial intelligence agents that perform tasks automatically on behalf of the user. It may also incorporate natural language processing (NLP) techniques and language models (or "large language models"—LLM). Furthermore, the present disclosure can involve querying multiple databases and automatic information retrieval systems, web scraping, indexing data and information from the web (e. g., advertisements), and utilizing chatbots and agents for task automation such as online search and purchasing.

The present disclosure also applies to artificial intelligence agents, for example, in shopping assistants or "shopping co-pilots." These agents assist users or autonomously carry out the search and/or automated purchase of products or services from online classified advertisement websites, while maintaining a high degree of search personalization (also referred to as hyper-personalization).

The present disclosure is applicable across various sectors where online search and/or purchasing of products or services is relevant, including e-commerce for goods, classified advertisement websites of any type (e.g., real estate), service booking tools, online search engines, or result aggregators that consolidate outcomes from multiple search engines.

The present method introduces improvements, over the existing literature, in at least the following areas:

1. Optimization Problems with Mandatory Constraints and Preferences (Representable Via Directed Acyclic Graphs or DAGs):

The study of optimization problems with mandatory constraints and preferences is well-established in the literature. For instance, in "Combining Approaches for Solving Satisfiability Problems with Qualitative Preferences" and "Computing All Optimal Solutions in Satisfiability Problems with Preferences", the authors demonstrate how to model such problems and find either one optimal solution (the former) or all optimal solutions (the latter).

However, in the aforementioned works, admissible solutions must satisfy a propositional formula. Other known approaches address a similar problem that involves representing partially ordered preferences, but they propose methods that do not guarantee Pareto-optimality for search results with maximum scores or equivalence of search results when preferences are represented as a directed acyclic graph (DAG). DAGs, by definition, may include multiple roots, parallel branches, and so forth, yet these methods do not consider the topological ordering of the DAG. Additionally, they do not account for the representation of negative preferences as nodes in the DAG, preferences on formulas, or the ability to transform quantitative preferences into qualitative preferences. In any case, these approaches are designed for narrow applications in specific domains.

Examples of such cases include patents US 2021/0081854 A1 (Valverde JR L. James et al. [US]) and WO2018/081020 A1 (CARLABS INC [US]). Patent US 2021/0081854 A1 describes a travel booking platform based on the assignment of weights to attributes (e.g., carrier, dates, costs) and the generation of a cumulative score. However, it does not address the representation of preferences via DAGs, which in the general case may include multiple roots and parallel branches. It does not consider negative preferences nor preferences on formulas, nor illustrate a mechanism for incremental score computation that avoids restarting calculations when new results are introduced. Moreover, it does not present an algorithm that, using a sufficiently "super-additive" function, ensures that the weights of nodes at a generic (higher) level are greater than the sum of any combination of nodes at a lower level. Nor does it provide for parallel computation that preserves the properties of optimality with respect to DAG preferences and equivalence, while avoiding post-hoc dominance tests on all search results.

WO 2018/081020 A1 illustrates a system based on "recipes" (recipe-nodes) and utility functions (e.g., "Normalized Utility Values"), suggesting a scoring structure that is substantially linear (averages or weighted sums). Although it mentions a graph to justify choices (the so-called "recipes"), it does not address the representation of multi-level DAG preferences with an exponential (or otherwise super-additive) weighting function that prevents lower-level nodes from exceeding the weight of a higher-level node. Additionally, it does not describe incremental and parallel management of progressively arriving search results, nor a mechanism to avoid global dominance testing.

In database-based approaches, such as Preference SQL and the document US20090077001A1, all admissible solutions are already available and stored within a database.

However, in systems requiring high scalability, as in the case of the present disclosure, where it is necessary to search for solutions across a vast multiplicity of databases and/or websites while serving requests from potentially millions of users, approaches from the known art are impractical due to their inefficiency in computation times and lack of scalability. These methods require that all potential solutions be already available and/or stored in a database or implicitly defined by a propositional formula.

The existing solutions would thus require identifying and storing all solutions in a database and only then solving the optimization problem with respect to preferences, potentially over an enormous number of solutions.

In contrast, the present disclosure proposes a method for computing optimality scores—also in a distributed manner—that enables a highly scalable and parallelized system for retrieving structured and unstructured information. This method can be applied in contexts where the possible solutions are not yet fully available. Furthermore, optimal solutions are calculated in parallel by solving very small optimization problems, ensuring globally optimal search results as soon as the final batch of results completes processing.

2. Large Language Models for Representing Hard Constraints and Preferences:

Language models such as BERT and GPT have become de facto standards for addressing problems related to natural language processing. While these models are capable of understanding and generating natural language text, the interpretation of user constraints and preferences to transform them into combinatorial optimization problems is still an underexplored area.

Recent research, such as " ", has begun addressing the challenge of transforming natural language inputs into formal constraint representations. However, such studies do not focus on transforming natural language preferences into directed acyclic graphs (DAGs).

3. Web Scraping/Crawling for Indexing Online Listings:

Numerous patents, such as U.S. Pat. No. 8,099,401B1, describe various techniques for web indexing to collect data from websites. However, the application of these techniques is usually limited to mere data collection, without real-time processing or integration with the interpretation of user constraints and preferences. Additionally, these techniques are not part of systems or methods aimed at retrieving optimal search results based on user requests.

4. Chatbots for Natural Conversation with Users:

Chatbots are widely used in various sectors to interact with users. However, systems from the known art do not address the complexity of search or purchase requests requiring the interpretation of user constraints and preferences, as well as the resolution of combinatorial optimization problems aimed at identifying the most relevant listing or optimal search result for the user.

5. Chatbots Interacting with Other Chatbots:

There are patents that describe methods in which a chatbot can interact with other chatbots or humans. However, the use of such interactions for negotiating or completing the purchase of products or services is not adequately addressed, particularly in the context of searching for or purchasing optimal or sub-optimal items based on user references.

6. Automatic Purchasing and Online Form Completion:

One of several advantageous aspects of the proposed method and system is its ability to complete purchases automatically. This includes interacting with purchase forms and web pages by automatically populating fields with buyer data to finalize the transaction. This functionality, as part of a system designed for searching for or purchasing optimal or sub-optimal search results, has not been explored in the known art.

The combination of these six areas into methods and systems proposed herein, represents various improvements and solutions over the existing automatic information retrieval systems and distributed database systems. The synergistic interaction among traditional database management systems, natural language understanding, combinatorial optimization executed with high efficiency and scalability, chatbot interaction, and automatic actions on query results substantially enhances the level of automation and personalization in the field of optimal search results for queries to database systems and automatic information retrieval systems.

In some aspects, the present disclosure describes a method and system that allows for the collection of search criteria from a user or system, optionally expressed in natural language, related to personalized search results to be obtained from information processing systems in general. Specifically, this may include distributed database, third-party websites (e.g., those structuring data related to products, services, job offers, apartments, news, etc.), or automatic information retrieval systems. These criteria are structured as mandatory constraints to be satisfied (e.g., price, city, etc.) and/or preferences—constraints that are desirable but not mandatory, defining an optimization problem. These preferences are expressed as partial orders over search elements, representable via a directed acyclic graph (DAG).

The method optionally uses language models (or "Large Language Models"), but it does not exclude other techniques, including those encoded through rules. These techniques enable the reception of unstructured free-text input from the user, possibly across one or more interactions between the system and the user or another system. The output is a well-defined and structured data representation of mandatory constraints and preferences (e.g., in JSON format).

The result is the formal representation of a combinatorial optimization problem, allowing for the identification, within relational and non-relational (e.g., noSQL) databases, text indexing systems, or information processing systems (including di tributed systems), of search results that meet mandatory search criteria and identify the set of solutions or search results optimal with respect to the preferences.

The present disclosure may be applied in a central coordination module of a system managing distributed, heterogeneous, non-federated, and, in most cases, non-relational databases (or systems). In its application to classified ad systems and websites, instead of indexing and storing online ads within the system, the method may allow for executing multiple parallel queries to systems or databases that represent ad data. The user's mandatory constraints are passed along, and the results are subsequently aggregated and ordered according to the user's preference DAG. An optimality score is computed and assigned tb each result.

Combinatorial optimization problems with preferences may also admit multiple equally optimal (Pareto-optimal) solutions. The method can return one or more optimal solutions for the user's request and, after listing one or more optimal solutions, also enumerate sub-optimal solutions in order of optimality (level of preference satisfaction).

The calculation method introduces the computation of a score, referred to as the optimality score, assigned to each admissible solution or search result, ensuring several properties.

The method described in this disclosure ensures that the computed "Pareto-optimal" search results have the same weight or optimality score and that search results with higher scores (lower scores in another implementation) dominate those with lower scores (higher scores in another implementation) according to the concept of optimality specified through preferences. Additionally, the method considers the diversity of data types, including unstructured data, present in search results such as online advertisements. For example, it allows representing each advertisement or, more generally, search result, which contains a concrete multiplicity of data types (e. g., date, title and description string, monetary value in a specific currency, location, etc.), in a formal representation that can verify the fulfillment of mandatory constraints and preferences related to such data.

The method interacts with users or systems and enables the collection and transformation of an unstructured description of user requirements, optionally starting from voice or textual content, into a formal representation that models a formal optimization problem with mandatory constraints and preferences. These preferences can be represented as partial orders or directed acyclic graphs (DAGs).

As an illustrative example of a potential application, consider a user who wishes to find an apartment that best meets their needs. In many cases, the user is required to manually conduct multiple queries across various databases or perform numerous searches on multiple different websites. Even when using aggregator sites for advertisements, the user should still set up multiple searches in parallel, as these aggregator sites do not find the optimal search result according to the user's preferences expressed with a partial order of search criteria.

An example of a problem solved by the present disclosure: A user starting their search may not initially know whether their budget is sufficient to find a property with outdoor space. For the user, a terrace and a garden might be equally preferred, or they may prefer a terrace over a garden, while a property without either is less desirable. In this context, modeling a problem with mandatory constraints (also known as "hard constraints") and preferences (also known as "soft constraints," e.g., terrace preferred over garden) enables the system to provide the optimal search result for the user in a single interaction, based on results that meet the mandatory constraints.

Moreover, when constraints, such as budget, are more flexible, and the user is unaware of the market value of a property with certain characteristics, these constraints can be modeled as preferences. The method described in the present disclosure can discover solutions that the user might not have considered feasible within their budget, while also meeting their preferences (e. g., outdoor space).

In this example and throughout this document, the terms "solutions" and "search results" are used interchangeably, as the latter represent a concrete example of solutions to optimization problems with preferences, as defined in the context of queries to information processing systems described in the present disclosure.

From a technical perspective, the present disclosure may be regarded as a unique module within database management systems, applicable both to a single database and as a coordination module for a distributed and heterogeneous system of databases, including non-relational databases.

Exemplary methods and systems presented herein may include four main components: "interaction with user/external system," "real-time search/batch processing," "alerting/reporting," and "automatic purchasing."

Interaction with User/External System:

This component interacts with users and/or external systems via a web interface, free-form written or vocal conversation (subject to subsequent transcription), or through standardized message exchanges with third-party systems. It collects input, including mandatory constraints and/or search preferences, which may initially be represented in an unstructured format or as free text. It then may transform the input into a structured format comprising the mandatory constraints and preferences for the search crit ria. Finally, it returns the optimal and/or sub-optimal search results to the user or the external system requesting the service. If necessary, it can manage multiple exchanges and interactions with the user or external system, both during the initial definition of requirements an during a redefinition phase after the proposed search results are reviewed.

Real-Time Search/Batch Processing:

This component may include two logical subcomponents that can be used alternatively depending on the system configuration or implementation, but both address the logical task of retrieving search results—potentially satisfying mandatory constraints—from external databases or information processing systems, such as third-party websites.

Batch processing is implemented using data aggregators from the web or external databases or information processing systems. These may be software nodes within the system that continuously (or on a scheduled basis) extract data from databases or index and/or store unstructured data from external systems.

If the external systems are websites, the system may employ universal or site-specific data crawlers/scrapers for each targeted advertisement site. These crawlers/scrapers may not require any user input but continuously index or retrieve advertisement data from the relevant websites, either through dedicated APIs where provided or via web scraping. Additionally, they index or store data resulting from queries to external systems.

In the batch processing configuration, the extracted data can be saved locally within the system, for example, in relational databases, non-relational/noSQL or document-based databases, components for indexing textual documents, Boolean logic formulas, or DAGs for preferences (e. g., CNF formulas in SAT problems with preferences). These storage and data representation methods are not limited to the aforementioned options.

In another configuration, the "real-time search" logical component may enable ad hoc searches executed in real-time on databases or third-party systems/websites when the user or external system provides input for their request. In this configuration, the system may not need to save data locally but progressively return the optimal and/or sub-optimal search results to the user or requesting system.

In this configuration, the user or system may provide mandatory constraints and preferences as input. The "real-time search" component may perform parallel searches across multiple websites and/or databases and/or external systems, passing only the mandatory constraints. As subsets of solutions, generally incomplete, are progressively obtained—that is, admissible search results—the proposed method is applied to determine the optimality score based on the preferences to be associated with each search result.

This method may involve applying partial or local ranking processes ("partial rankers"), potentially one or more for each website or portion of it, which calculate an optimality score for each solution/search result. The global ranking process ("global ranker") may iteratively process the locally optimal search results returned by the partial rankers as soon as they are available. Whenever a new partial ranker completes its process, the global ranker may compare the optimality scores of the currently available globally optimal search results with the locally optimal search results returned by the partial rankers. If necessary, the global ranker may update the ranking of the globally optimal search results.

The considerable advantage of this method lies in achieving very high scalability, parallel and distributed computation, and overall system efficiency.

The globally optimal search results, or Pareto-optimal solutions with respect to the user's preferences, may become available as soon as the last partial ranker (pr) completes its process and the global ranker (gr) updates the ranking of globally optimal results with the scores and solutions from the last partial ranker. The computationally demanding problem may thus be decomposed into many simpler problems, distributed across numerous computational nodes, making it more manageable.

The proposed method for calculating an optimality score eliminates the need for dominance testing between solutions, which would otherwise be required in known approaches. Such approaches use dominance or optimality tests to determine if a current solution is optimal by checking if no other solution satisfies the mandatory constraints and dominates it (i.e., better respects the user's preferences). These approaches require comparing every new search result against all results currently identified as optimal and, among other things, traversing the entire preference DAG each time.

In contrast, the present disclosure introduces a method to calculate the optimality score of a newly obtained search result, allowing for a simple comparison of the new result's score against the scores of currently identified optimal search results.

Another significant advantage of the proposed method is its ability to progressively return locally optimal search results from the partial rankers, which are globally sub-optimal results, as they become available. The returned list is continuously updated. The user or system providing the input can, for instance, interrupt the search if the input is incorrect or imprecise, if they want to update their preferences, or if they decide to modify mandatory constraints and preferences based on partial results already provided. This flexibility is not possible with the monolithic and less scalable methods referenced in the known art.

Regardless of whether batch or real-time search is used, the method and system may include a module for calculating optimal and/or sub-optimal search results relative to mandatory constraints and/or preferences.

Alerting/Reporting Component:

This component may allow continuous monitoring or periodic automatic repetition of the searches configured by the person or external system, hereafter referred to as the user of the presented method and system. The user can request periodic updates with a report listing a certain number of optimal and sub-optimal search results identified u to that point or can request alerts when a search result is found that satisfies a more relevant or additional preference compared to those previously considered.

Automatic Purchasing or Negotiation Component:

This component can enable a chatbot agent to operate in two odes: Impersonation and/or Negotiation:

The chatbot agent may impersonate the client user to inquire about the product/service or, in general, the object of the obtained search result. It ay negotiate the price and arranges the acceptance of the purchase through chat, as well as the subsequent shipment by the seller (in the case of products) or the execution of the order.

Automated Actions for Purchase:

In one embodiment, the chatbot may perform automated actions on the browser (e. g., clicking and/or filling out web forms) to complete the purchase on behalf of the user for one of the currently optimal or sub-optimal search results. This may occur either if the user has explicitly confirmed the purchase following the "alerting/reporting" feat re or in an automatic mode, where the method finalizes the purchase if no better search result emerges within a specified time frame compared to one of the currently optimal results.

BRIEF DESCRIPTION OF DRAWINGS

These and other features and advantages of the present disclosure will become clear from the following description of example embodiments provided for illustrative and non-limiting purposes with the aid of the attached figures, in which elements indicated with the same or a similar numerical reference denote elements that have the same or similar functionality and construction, and in which.

LIST OF DRAWING ELEMENTS

Figure 1:
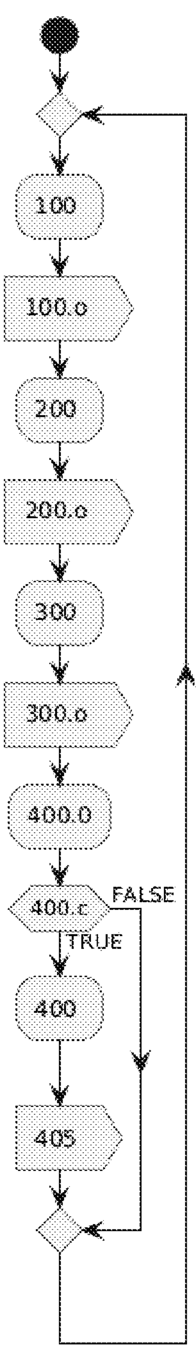
FIG. 1—Represents a general flowchart of the overall process (1) in its non-optimized version, which first calculates all admissible search results (that satisfy the mandatory constraints) and subsequently computes the optimality scores with respect to the preferences, ordering the search results according to these scores. This figure provides an overview of the entire system, illustrating how all the described processes interconnect. It shows the input from the human user or external system, which passes through various processes, ultimately generating a ranked list of search results with associated optimality scores and potentially leading to the purchase of the selected search result.

For clarity, the following is a list of drawing elements and their respective reference numbers in the present disclosure and drawings, particularly but not exclusively, relating to FIGS. 1-9:

FIG. 1:

- 100—Collection and Formal Representation of Mandatory Constraints (HC) and Preferences (Pref).
- 100.*o*—Textual and Structured Representation of HC and Pref.
- 200—Retrieval of Search Results Corresponding to HC.
- 200.*o*—All Search Results Satisfying HC from Websites and/or Third-Party Databases and/or Search Engines.
- 300—Calculation of the Optimality Score for Search Results.
- 300.*o*—Ordered List of Search Results by Optimality Score.
- 400.0—Verification of Search Results with Optimality Score by the User/External System.
- 400.*c*—Has the User/External System Selected a Search Result to Purchase?
- 400—Automatic Purchase or Negotiation.
- 405—Purchase Order.

FIG. 2:

- 100.1—User's Voice Description of the Search and Optimization Problem OR Input from External System (Optional)
- 100.2—Voice-to-Text Conversion (Optional)
- 100.3—Unstructured Textual Description of Mandatory Constraints (HC) and/or Preferences (Pref)
- 100.4—Are Mandatory Constraints Available?
- 100.5—Processing of Mandatory Constraints
- 100.6—Structured Representation of Mandatory Constraints
- 100.7—Are Preferences Available?
- 100.8—Processing of Preferences
- 100.9—Structured Representation of Preferences (DAG)

100.10—Repeat/Refine Process?

FIG. 3:

150.1—Create Directed Acyclic Graph G from Preferences

150.2—Generate Topological Ordering of G and Assign it to top_order

150.3—Initialize Dictionary of Levels layers

150.4—For Each Node in top_order (Are Nodes Still Available?)

150.5—Compute node_layer as the Maximum Value Among its Predecessors' Levels, or 0 if it has No Predecessors

150.6—Assign node_layer to the Node

150.7—Add the Node to the Dictionary layers at its Corresponding node_layer

150.8—Determine Maximum Level from layers and Assign it to max_layer

150.9—Initialize previous_layer_sum to 0

150.10—Iterate Over the Level layer from max_layer to 0

150.11—If layer is max_layer

150.12—Set Weight to 1

150.13—Compute Weight as the Next Power of 2 Greater Than previous_layer_sum+1

150.14—Assign Weight to All Nodes at the Current Level layer

150.15—Update previous_layer_sum by Multiplying the Weight by the Number of Nodes in layer

150.16—Return Updated G

FIG. 4:

300.1—Receive Search Result 'SR' that satisfies Mandatory Constraints 'HC'

300.2—Receive the set of Preferences 'Pref,' representing the variables that form the nodes of the preference DAG

300.3—Compute 'PrefInSR' as the intersection between 'SR' and 'Pref,' representing the preferences present or satisfied in 'SR'

300.4—Receive Weights for each variable in 'Pref,' previously computed by process 150 to capture a partial order of preferences

300.5—Initialize the Optimality Score of 'SR,' called 'OptimalityScore,' to 0

300.6—Initialize an iterator for elements in 'PrefInSR'

300.7—Are there remaining elements in 'PrefInSR'?

300.8—Add the weight of the current element to 'OptimalityScore'

300.9—Move to the next element

300.10—Return the 'Optimality Score' of 'SR'.

FIG. 5:

200.*i*—Queue containing URLs of websites/system details to be queried

200.0—Initialization of "Workers" for system queries

200.*c*—Are there additional URLs or system references in the queue to query?

200.*ii*—HC & (URL OR system reference to query)

200.00—"Workers" query the website via URL with HC, OR query a local database for indexed results satisfying HC, OR query external systems via API, retrieving and storing batches of search results that meet HC

200.*o*—Queue containing batches of search results that satisfy HC

Figure 4:
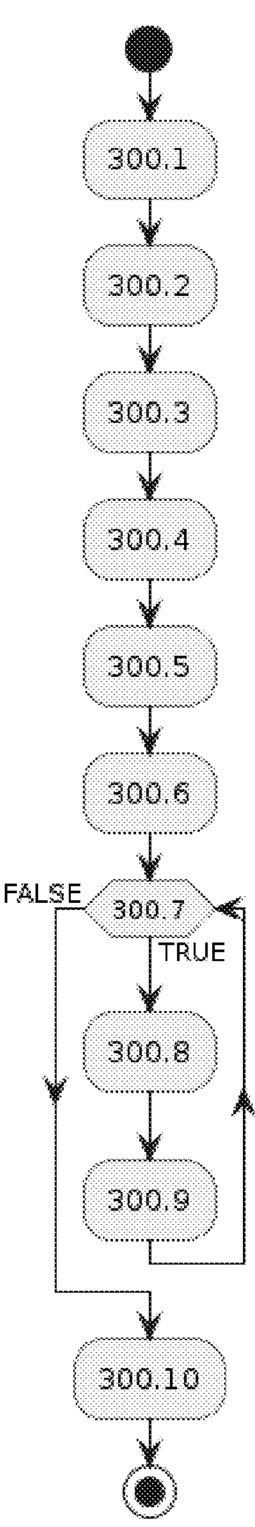
FIG. 4—Represents a flowchart for the 301.1 process of calculating the optimality scores, specifically for computing the optimality score of a search result within processes 300 or 301 in the parallelized version. The figure illustrates how, leveraging process 150 (initialization of weights on the directed acyclic graph), it is possible to efficiently compute the optimality score for a search result without traversing the directed acyclic graph, as the partial ordering of the graph nodes is already represented by the weights computed in process 150. For each solution, that is, a list of characteristics present in or satisfied by a search result, the optimality score can be assigned using the method in FIG. 4. This guarantees compliance with the defined properties and enables ranking search results in terms of optimality, ultimately returning the optimal search results to the user while ranking sub-optimal ones by their respective optimality scores. It is sufficient to have a search result and the list of weights derived from the initialization of the preference DAG to compute the optimality score of the current search result, implicitly defining the importance of the current solution in relation to future search results that will be identified.

The 301 workers retrieve messages from this queue containing the necessary information to identify the list of search results and compute the optimality score for each, leveraging the preference DAG weights initialized in process 150 and the method in FIG. 4.

The specific labels used indicate:

301.*i*—Queue containing batches of search results satisfying HC

301.0—Initialization of "Workers" for Score Calculation

301.*c*—Are there additional search results in the queue?

301.*ii*—Search Result & Preferences & DAG Weights

301.00—"Workers" compute the optimality score and write the batch of search results with optimality scores to the Partial Ranking Queue

301.0—Queue containing batches of search results with computed optimality scores The 302 workers retrieve messages from the queue written by 301, sorting the batch of search results according to their optimality scores. These workers are also called "partial rankers," as they perform partial ordering of elements within the batch.

The specific labels used indicate:

302.*i*—Queue containing batches to be sorted

302.0—Initialization of "Workers" for Partial Ranking

302.*c*—Are there additional search results to sort in the queue?

302.00—"Workers" sort a partial list of search results

Finally, process 303 takes as input the sorted lists of search result batches obtained from 302 and, using a "divide and conquer" sorting method similar to merge sort, combines the solutions of the subproblems to produce the final list of all optimal and sub-optimal search results, sorted by optimality score.

The specific labels used indicate:

303.*i*—Partially sorted lists of search results with associated optimality scores

303.0—Global sorting of search result lists

303.*o*—Globally sorted list of search results with optimality scores

400—Selection of search result & Automatic Purchase/Negotiation

400.0—User/External System evaluates search results with optimality scores

400.*c*—Does the user/external system select a search result for purchase?

400.00—Automatic Purchase or Negotiation

400.*o*—Purchase Order

By design and as a consequence of the intrinsic properties of method 150, search results with the same highest optimality score represent the optimal search results of the optimization problem, while subsequent results in the ranking represent sub-optimal solutions.

FIG. 6:

CS—Cloud services or hardware/software infrastructure where the system implementing the method is installed.

100.*q*—Input Processing Queue for Process 100.

150.*q*—Weight Initialization Queue for Process 150.

200.*q*—Search Results Retrieval Queue for Process 200.

301.*q*—Score Calculation Queue for Process 301.

302.*q*—Search Results Sorting Queue for Process 302.

303.*q*—Global Ranking Queue for Process 303.

2000—Worker for Process 200—Search Results Retrieval.

3010—Worker for Process 301—Score Calculation.

3020—Worker for Process 302—Search Results Sorting.

3030—Worker for Process 303—Global Ranking.

1000.2.1—Load Balancer.

14—Web Server (14).

14.1—Application Manager.

1000.2.*d*—Database management system or internal information retrieval system implementing the present disclosure.

1000.2.*d.rr*—Database or searchable index of search results.

18.*u*—Internet network (18)—User Interaction.

18.*u.n*—Network devices (User Interaction).

18.*rr*—Internet network (18)—Search Results/Data Retrieval.

18.*rr.n*—Network devices (Search Results Retrieval).

16.*ws*.1—Website No. 1 (16).

16.*ws*.1.*sw*—Software for Website No. 1.

16.*ws*.2—Website No. 2 (16).

16.*ws*.2.*sw*—Software for Website No. 2.

16.*se*—Search Engine.

16.*se.sw*—Search Engine Software.

16.*db*—Database (16).

16.dbms.1—Database Management System (16).

12.*ud*—User Device (12).

12.*ud.sw*—App/Web App/Chatbot Client.

12.*ext*—External System (12).

12.*ext.sw*—External Software Agent.

1000.1—User.

100.*w*—Worker for Process 100—Input Processing.

150.*w*—Worker for Process 150—Weight Initialization.

A.1—Interaction with App/Web App/Chatbot.

A.2—Sends Requests.

A.3—Sends Requests.

A.4—Request Routing.

A.5—Load Distribution.

A.6—Delegates Input Processing.

A.7—Delegates Weight Initialization.

A.8—Retrieves Search Results and/or Data.

A.9—Queries Website (16.*ws*.1).

A.10—Queries Website (16.*ws*.2).

A.1 1—Queries Database (16.*db*).

A.12—Queries Search Engine (16.*se*).

A.13—Response from Website (16.*ws*.1).

A.14—Response from Website (16.*ws*.2).

A.15—Response from Database (16.*db*).

A.16—Response from Search Engine (16.*se*).

A.17—Delegates Search Results Retrieval.

A.18—Delegates Score Calculation.

A.19—Delegates Search Results Sorting.

A.20—Delegates Global Ranking.

A.21—Sends Responses.

A.22—Receives Results.

A.23—Receives Results (12.*ud*).

A.24—Receives Results (12.*ext*).

A.25—Displays Results.

The first number of the labels in the diagram refers to the component's category, e.g.:

(12) for user devices or external systems that initiate the method.

(14) for servers implementing the method.

(16) for external systems such as databases, database management systems, automatic information retrieval systems, search engines, or web servers hosting websites.

(18) for geographic networks.

The initial part of the labels can also refer to the software components implementing the method or those logically involved in the implementation (such as workers or queues).

FIG. 7:

200.A.1—Database connection strings or URLs from a predefined list or URLs discovered during crawling.

200.A.2—Are there still available database connection strings or URLs from the predefined list or discovered during crawling?

200.A.3—Queries databases OR retrieves/extracts relevant data from the website at the current URL.

200.A.4—Processes and cleans the retrieved/extracted data.

200.A.5—Saves/Indexes the cleaned data in the system's database/search engine (10).

FIG. 8:

200.B.1—Mandatory constraints "HC" structured & (list of database connection strings or external systems OR predefined URL list OR API endpoint list).

200.B.2—Are there still available URLs, API endpoints or external system connections?

200.B.3—Retrieve/Extract relevant data from HTTP response after applying HC constraints to the webpage of the URL OR Execute API call passing HC constraints to the endpoint OR Query databases or external systems passing HC constraints in the query.

200.B.4—Save/Index relevant data in the System 10 database/search engine.

FIG. 9:

1000.1—User/External System.

1000.2—System implementing the present disclosure.

1000.2.1—Selection of the Optimal/Sub-optimal Search Result.

1000.2.2—Impersonates the User/External System by automatically opening the Selected Search Result in the browser via URL.

1000.2.3—Impersonates the User by automatically filling in t e Web Purchase Form with User Data (previously stored).

1000.2.4—Submits the Web Form to Complete the Purchase.

1000.2.5—Returns Purchase Confirmation.

DETAILED DESCRIPTION

One example implementation of the method (Process 1) and system is structured into a series of interconnected components and processes, each contributing to performing a specific part of the complex task of the present method. Each process is identified by a unique number used as a reference. The figures referenced herein form an integral but non-limiting part of this description of example embodiments.

Refer to FIG. 1 for the example implementation of Process 1 in a non-optimized form, where its constituent processes are executed sequentially. Instead, refer to FIG. 5 for the example implementation of the optimized flow of Method 1, where the processes exhibit a high degree of parallelization.

Figure 2:
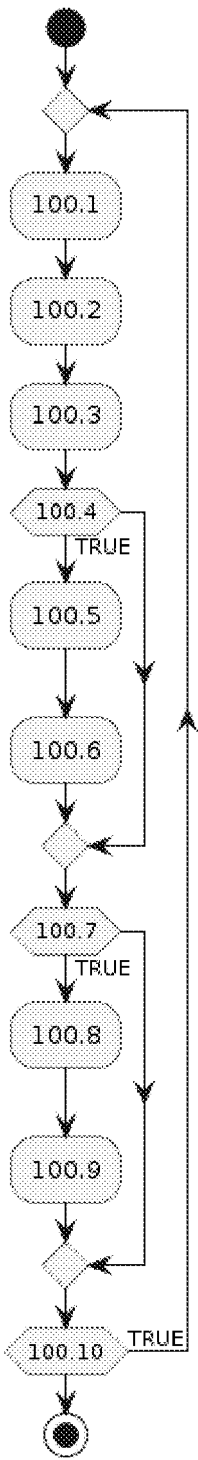
FIG. 2—Represents a flowchart of process 100 for collecting and formally representing mandatory constraints and/or preferences from a user or external system. This figure illustrates the process of first collecting, then understanding, and subsequently representing the user or external system's requests, transforming them from an unstructured/free-form input, such as natural language, into a structured representation of mandatory constraints and preferences, the latter being represented as a directed acyclic graph (DAG). The input optionally enters process 100 in the form of free text or voice, which is subsequently transformed into free text. The output is structured to formally represent an optimization problem with preferences.
Figure 3:
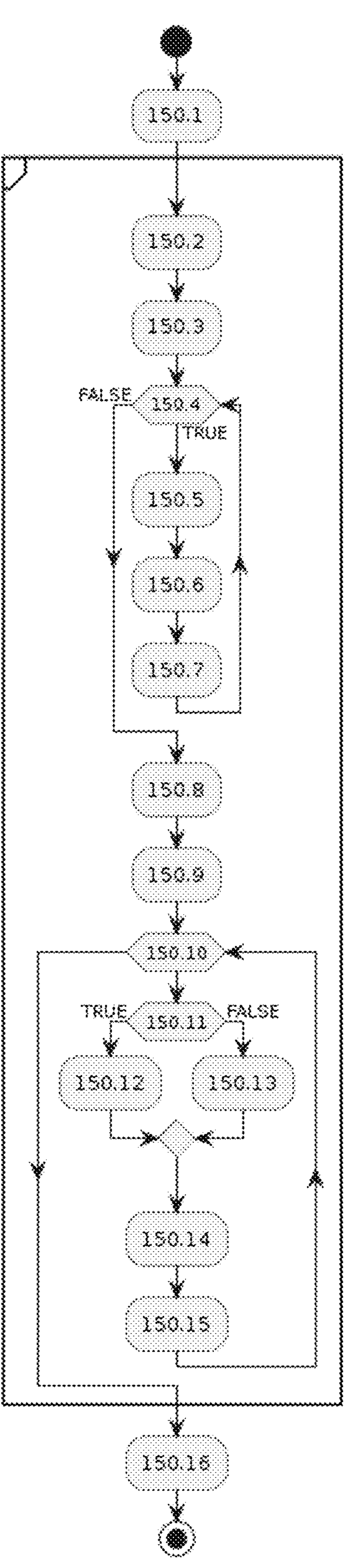
FIG. 3—Represents a flowchart for process 150, which initializes weights on the directed acyclic graph of preferences. This figure illustrates one of the fundamental components of the method and system, as it enables the initialization of the weights in the directed acyclic graph of preferences. It allows for the efficient computation of an optimality score for each admissible search result/solution (which satisfies the mandatory constraints) as soon as such results become available, without waiting for all possible search results to be computed. The assigned weights allow for the representation of the relative importance of specific characteristics/search criteria within a solution/search result based on the preferences expressed through the directed acyclic graph.
Figure 5:
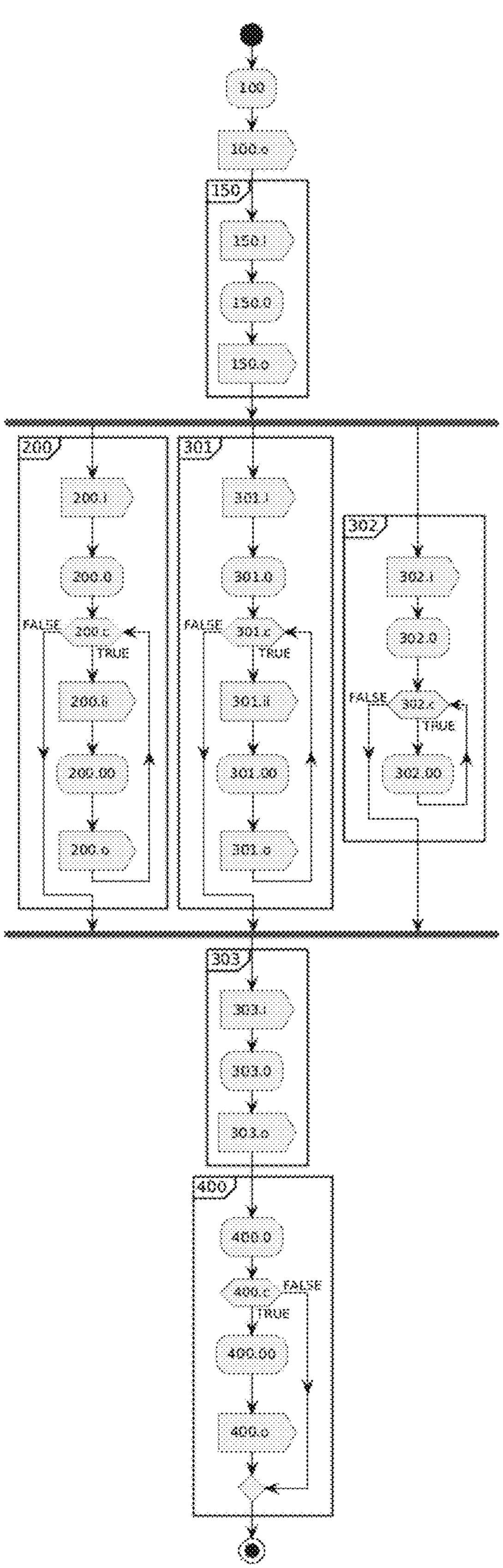
FIG. 5—The diagram represents the highly scalable and efficient version of the method shown in the overall process flowchart (Process 1) illustrated in FIG. 1, incorporating parallelizable computations.
Figure 6:
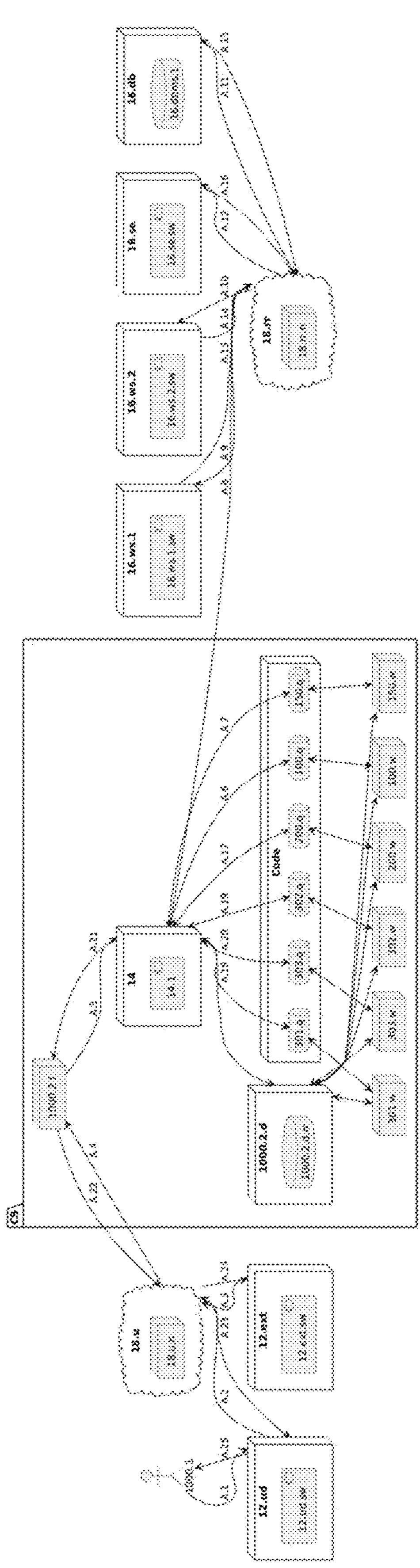
FIG. 6—Represents a deployment diagram, illustrating a possible hardware and software architecture for the system implementing the method (Process 1).

It should be noted that Process 100 in FIG. 2, Process 150 in FIG. 3, and Process 301.1 in FIG. 5 can maintain the same implementation both in the FIG. 1 version and the FIG. 5 version. For the FIG. 5 version, a proposed system architecture implementation is shown in FIG. 6. Below, we provide further details on the example implementation.

PHASE 100: Process 100 involves collecting and formally representing the user request in a format understandable by the system and method, enabling input processing and the generation of the final output.

The user input considers the content to be searched, potentially as a mix of structured and unstructured elements, as well as its characteristics.

For example, in the case of searching for listings on the web from multiple websites, a listing is characterized by:

Structured data, such as price (if indicated), location, title, or a short description of the subject of the listing (e.g., physical object, job position, apartment, offered service, or any other type defining the listing domain). These structured data elements are generally domain-independent.

Domain-specific structured data, such as:

Square footage for an apartment.

"Remote work" as a location for a job listing.

Frequency (e.g., monthly or weekly) for rental or lease listings.

Any type of structured data mentioned above—whether domain-specific or not—can be abstracted to become an element subject to mandatory constraints and a node in the user's directed acyclic graph (DAG) of preferences.

For unstructured data (e. g., a text description), the method may allow extracting characteristics from the text when they are not explicitly found in structured data, allowing these elements to become nodes in the preference DAG. Once this abstraction operation is performed (e. g., transforming specific data into DAG nodes), all structured and unstructured data from the listings can be formally represented, for example, using JSON format. The method then applies subsequent procedures to these abstracted representations to rank the results to determine Pareto-optimal and/or sub-optimal solutions.

Once this ranked list is obtained, it is returned to the user, containing the original listing data along with their corresponding measurement units, if specified.

A preference for a characteristic of a listing may be considered satisfied (i.e., it assumes the value "true") if:

The characteristic is present in the listing and is expressed in the DAG as a non-negated node.

The characteristic is not present in the listing and is expressed in the DAG as a negated literal, meaning the variable is preferred not to be included in the solution (i.e., the returned search result).

For reference, see "Combining approaches for solving satisfy ability problems with qualitative preferences" regarding the representation of preferences in Boolean satisfiability problems.

However, unlike the cited article, the present method is not limited to Boolean variables and can be applied to problems that represent constraints using any type of variable, not necessarily Boolean. The constraints can also involve inequalities, such as a price variable being lower than a certain threshold.

In such cases, when a listing is found on the web, a dedicated procedure verifies that the characteristics of the listing—or the set of variables representing it—satisfy all mandatory constraints. If this condition is met, the found listing is also considered an admissible solution to the problem.

To determine its optimality score, the method evaluates whether the variables of the listing belong to the nodes of the preference DAG, taking into account whether their presence or absence is preferred in the listing-solution.

Furthermore, the presented method is capable of computing and ranking optimal and sub-optimal solutions in any optimization problem where qualitative preferences are, for example, expressed on:

Literals (Boolean variables and their negation, indicating a preference for a feature to be present or absent).

Formulas, where satisfaction can be represented by a Boolean variable.

Such preferences on literals or formulas can be partially or totally ordered. For example, the expressive power of this preference representation framework is formally demonstrated in "Combining approaches for solving satisfiability problems with qualitative preferences", where it is shown that qualitative preferences on literals are more general and expressive than quantitative preferences. Additionally, quantitative preferences can be reduced to qualitative preferences on literals or formulas via appropriate encodings.

PHASE 150: Initialization of Preference DAG Weights

Process 150, illustrated in FIG. 3, is fundamental to the overall method, as it ensures that the previously defined properties of optimality and equivalence among solutions (i.e., search results) are satisfied.

One possible implementation of Process 150 is, for example, through the Python code presented in TAB. 1.

A step-by-step presentation of this process follows, providing a specific implementation with more detailed steps than those shown in FIG. 3, along with some additional utilities, such as preventing excessively high weight values through the application of a logarithmic function.

a) Assignment of the Topological Level

Nodes are assigned levels based on their position in the DAG (Directed Acyclic Graph), starting from 0 at the top.

TABLE 1

```
import networkx as nx
from collections import defaultdict
import math

# Function to assign weights according to be the layer
def assign_weights (G):
    # Generate topological sort of nodes
    top_order = list(nx.topological_sort(G))
    layers = defaultdict(set)

    # Assign layers
    for node in top_order:
        node_layer = 1 + max((G.nodes[pred] ['layer'] for pred in
G.predecessors(node)),default=−1)]
        G.nodes[node] ['layer'] = node_layer
        layers[node_layer].add(note)

    # Assign weights
    max_layer = max(layers)
    previous_layer_sum = 0
    for layer in range(max_layer, −1, −1):
        if layer == max_layer:
            weight = 1    # Bottom layer nodes have weight 1
        else:
```

TABLE 1-continued

```
        # The weight is the next power of 2 greater than the sum of weights in
the layer below weight = 2 ** math.ceil(math.log2(previous_layer_sum + 1))

        for node in layers[layer]:
            G.nodes[node] ['weight'] = weight

        previous_layer_sum += weight * len(layers[layer]) # Update the total weight
of the current layer
```

Nodes without predecessors are placed in level 0, while other nodes are assigned levels calculated based on their predecessors. This step is implemented rom lines 12 to 15 in TAB. 1.

b) Weight Assignment for the Lowest-Level Nodes

All nodes in the last level are assigned a weight of 1 (or any other constant value). This step is implemented from lines 18 to 22 in TAB. 1.

c) Weight Assignment Based on Lower Levels

Nodes at a generic level (except the last one) are assigned weights greater than the sum of the weights of all nodes at the immediately lower level. The weight is defined as the next power of 2 (or another base) that exceeds the sum of the weights of the nodes in the immediately lower level plus 1 (or another predefined constant value). This step is implemented from lines 23 to 25 in TAB. 1.

It should be noted that this implementation uses an exponential function with base 2, but any other exponential function (or any function ensuring that the current weight is greater than the sum of the weights of the nodes in the underlying DAG level) could be used.

Additionally, applying the logarithm helps prevent excessive weight growth, which could otherwise lead to overflow issues in DAGs with a large number of levels, while also providing computational efficiency benefits. Furthermore, the application of the ceiling function ensures rounding up to the next integer value of the logarithmic function result.

d) all Nodes at the Same Level are Assigned Equal Weights

Condition: All nodes within the same level are assigned the same weight. This step is implemented in lines 27 and 28 in TAB. 1.

e) Sum of Weights for Each Level

The total sum of the weights of all nodes in each level is computed to determine the weights of the nodes at the next level. This step is implemented in line 30 in TAB. 1.

f) Updating the Total Weight of the Current Level

These portions of the code ensure that the weight of each node is assigned based on its level in the topological order and that the assigned weights comply with the specified conditions.

Optimality of Solutions and Equivalence of Solution Scores Determined on a Directed Acyclic Graph (DAG) of Preferences Statement: Given a preference DAG, where nodes represent individual solutions and edges represent dominance relationships (a directed edge from node A to node B implies that A is preferred over B), the score assigned to each solution by the assign_weights procedure ensures the following optimality and equivalence properties:

- Optimality: The optimal solutions—i.e., solutions that are not dominated by any other solutions within the preference DAG—always receive the biggest optimality score (or the smallest score, in an ascending-like implementation).
- Equivalence: Solutions with the same optimality score are equivalent in terms of user preferences; no solution with the same score can dominate or be dominated by another solution with the same score.

Intuition Behind the Proof (not a formal proof).

- Optimality Property: Optimal solutions always receive the highest score
- Proof Intuition: consider a set of solutions S and their corresponding nodes in the preference DAG. The optimal solutions are those without incoming edges from other solutions in S, meaning that they are not dominated by any other solution.

Since the assign_weights procedure is designed to assign higher weights to nodes in the upper levels of the DAG (i.e., to solutions that are not dominated by any others), it ensures that higher-level nodes receive higher scores.

This is achieved through the weight assignment rule, which guarantees that the combined weight of nodes at any given level is always greater than the combined weight of all nodes at lower levels. The exponential function used in the assign_weights procedure plays a crucial role in enforcing this property.

Thus, optimal solutions, being located in the higher levels of the DAG, are assigned the highest scores, confirming the optimality property.

Equivalence Property: Solutions with the same score are equivalent in terms of preferences Proof Intuition: Consider two solutions, A and B, with the same score. Since the assign_weights procedure assigns weights based on the stratification derived from the topological ordering of the DAG, it follows that solutions with the same score should be at the same level.

Solutions at the same level are not directly connected by edges, meaning that no direct dominance relationship exists between them (i.e., neither dominates the other). This follows from the fact that a directed edge between them would violate the topological ordering and stratification of the DAG.

Thus, A and B are equivalent in terms of preferences, as neither dominates nor is dominated by the other when they have the same score.

In conclusion, the weight assignment procedure applied to the preference DAG in Process 150 ensures that the score assigned to each search result, calculated through Process 300 (or efficiently computed via Processes 301, 302, and 303), accurately reflects its position within the preference hierarchy represented by the DAG. Optimal solutions, as they are not dominated by others, are assigned the highest scores. Solutions with equal scores are equivalent in terms of preference, ensuring a fair and consistent representation of preferences according to the structure of the DAG.

This theorem, therefore, states the properties of optimality and equivalence of the assign_weights procedure and Process 300 in representing preferences within a DAG, ensuring that the highest scores indicate a greater preference and that equal scores imply equivalence of preference among solutions. Having defined the equivalence between "solution" and search result or online listing, it is thus possible to obtain the optimal ranking of online listings according to the user's preferences and mandatory constraints on the characteristics of the listing-solutions in the optimization problem. Notice that, in another implementation of assign_weights, the scoring method might assign scores differently; for example, by assigning the smallest score to the greater preference and rank node weights in ascending order instead of descending order, as what matters is to keep such a distance between nodes weights, for example, an exponential distance between DAG layers/levels, that allows the satisfaction of the above properties in the presence of preferences represented by any DAG.

Figure 7:
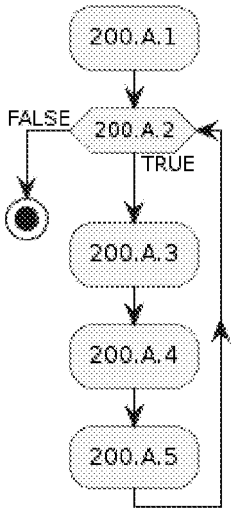
FIG. 7—The diagram represents Process 200 in batch mode, illustrating the process of web crawling/scraping and web indexing in batch mode.

PHASE 200: in FIG. 7, Process 200 in batch mode is illustrated, representing the web crawling/scraping and indexing process in batch mode. It shows that the system collects data from various predefined URLs (or discovered dynamic 11*y*, as in traditional crawling systems) and that the results are then indexed for use within the system, potentially becoming search results.

Figure 8:
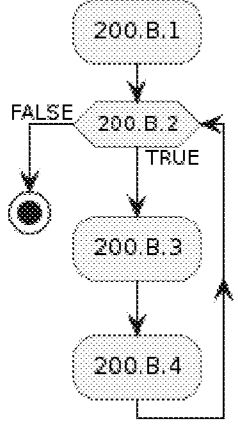
FIG. 8—The diagram represents Process 200 in real-time rode.

In FIG. 8, a flowchart of Process 200 in real-time mode is presented. It shows that the system collects and indexes data from websites (or databases or, more generally, information processing systems) in real-time, in response to a user request or a third-party system request, as an alternative to querying system repositories (System 10), previously populated through the batch processes illustrated in FIG. 7.

PHASE 300: in this phase, starting from the structured representation of mandatory constraints and preferences, along with the list of search results obtained from Phase 200 that satisfy the mandatory constraints, a global optimality score is assigned to each search result. The resulting list is then sorted in descending order based on the optimality score. In the parallelized version of this phase, as represented in FIG. 5, Processes 301, 302, and 303 operate in parallel on batches of search results:

- Process 301 computes the optimality scores for batches of results
- Process 302 sorts each batch individually in descending order based on the optimality score
- Process 303 merges the partially sorted batches into a globally ordered list of results.

PHASE 400: process 400 is responsible for collecting the user's selection of a search result (whether by a human user or an external system) and impersonating the user to complete the transaction. The method executes the following steps:

- Automatically opening a browser at the URL of the selected search result.
- Automatically filling out web forms required to finalize the purchase, using previously stored user data (e.g., saved in the browser, a browser extension, or another system).
- Completing the purchase on behalf of the user.

Figure 9:
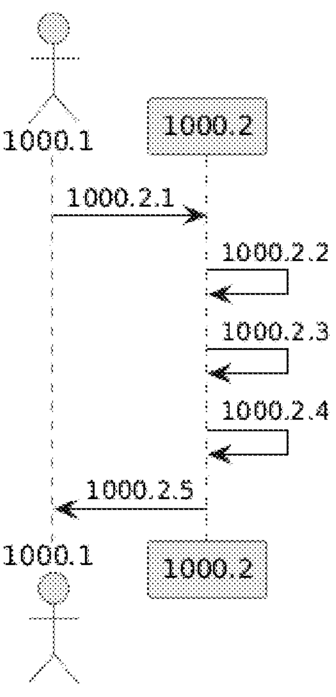
FIG. 9—The sequence diagram represents the interaction related to Process 400.

FIG. 9 presents a sequence diagram illustrating this interaction. Instead of actions 1000.2.3 and 1000.2.4 in FIG. 9, the method and system could alternatively automatically generate and send a chat message to the seller associated with the selected search result, in cases involving online classified listings. This would involve using a language model trained for conversational interaction, along with a customized instruction prol pt, to either request more information or submit a financial offer to the listing author. The implementation of Process 400 as described here could be achieved, for example, through a browser plugin or extension, capable of accessing user data and performing actions on web pages on behalf of the user.

Concrete Examples of Search Result Representation and Computation of Optimal and Sub-Optimal Results Based on Mandatory Constraints and Preferences Below, we provide examples of the complete method, starting with user requests expressed in natural language, containing both mandatory constraints and preferences. These requests are then represented as a directed acyclic graph (DAG). Subsequently, we outline the calculation method that leads to optimal and sub-optimal search results, along with their associated optimality scores.

"Hello bot, I am looking for an apartment in New York City. I would possibly like a terrace. Preferably in the Manhattan or Brooklyn district. The area is more important than the terrace."

Process 100 produces a formal representation (e.g., in JSON) containing:

Hard Constraints:
Type: Apartment
Price:
City: New York City
District:
Features: [ ]
Preferences:
Features: ['Manhattan', 'Brooklyn', 'Terrace']
Relative Importance: ['Manhattan>Terrace', 'Brooklyn>Terrace']
Node Manhattan has a weight of 2 and is located at layer 0.
Node Brooklyn has a weight of 2 and is located at layer 0.
Node terrazzo has a weight of 1 and is located at layer 1.
Topological sorting: ['Manhattan', 'Brooklyn', 'Terrace']
Optimality score for the solution: ['Manhattan', 'Terrace']: 3
Optimality score for the solution: ['Queens', 'Terrace']: 1
Optimality score for the solution: ['Manhattan', 'Garden']: 2

"I am looking for an apartment in New York City. The maximum price is 600,000 euros. It must have a terrace. I would like to have a garage, a cellar, and a view; the garage is more important than the cellar; the cellar is more important than the view."

Process 100 produces a formal representation (e.g., in JSON) containing:

Hard Constraints:
Type: Apartment
Price: 600,000
City: New York City
District:
Features: ['Terrace']
Preferences:
Features: ['Garage', 'Cellar', 'View']
Relative Importance: ['Garage>Cellar', 'Cellar>View']
Node Garage has a weight of 4 and is located at layer 0
Node Cellar has a weight of 2 and is located at layer 1
Node View has a weight of 1 and is located at layer 2
Topological sorting: ['Garage', 'Cellar', 'View']
Optimality score for the solution: ['Garage', 'Cellar', 'View']: 7 representing the global optimum.

"Look for an Apple Watch in Rome. The maximum price is 500 euros. Better if with a 44 mm screen. White is better than black."

Hard Constraints:
Type: Watch
Name: Apple Watch
Price: 500
City: Rome

District:

Features: [ ]

Preferences:

Features: ['44 mm Screen', 'White', 'Black']

Relative Importance: ['White>Black']

Node '44 mm Screen' has a weight of 2 and is located at layer 0.

Node 'White' has a weight of 2 and is located at layer 0.

Node 'Black' has a weight of 1 and is located at layer 1.

Topological sorting: ['44 mm Screen', 'White', 'Black']

Optimality score for the solution: ['44 mm Screen', 'Black']: 3

Optimality score for the solution: ['44 mm Screen', 'Gold']: 2

Optimality score for the solution: ['40 mm Screen', 'White']:

Optimality score for the solution: ['40 mm Screen', 'Black']: 1

More generally, given characteristics of an ad represented by any type of data, including its negation to model when data is not preferred, exemplified by a letter of the alphabet:

"Search for an Apple Watch in Rome for me. The maximum price is 500 euros. I prefer it to have the characteristics A, B, C, D, E, F, G. But A is better t an B, B better than C, C better than D, A better than E, F better than G."

Hard Constraints:

Type: Watch

Price: 500

City: Rome

District:

Features: [ ]

Preferences:

Features: ['A', 'B', 'C', 'D', 'E', 'F', 'G']

Relative Importance: ['A>B', 'B>C', 'C>D', 'A>E', 'F>G']

In this preference DAG, A and F are at the same relevance layer, B, E, and G at the second layer, C at the third, and D at the fourth and final layer.

Topological sorting: ['A', 'F', 'B', 'E', 'G', 'C', 'D']

Node A has a weight of 16 and is at layer 0

Node B has a weight of 4 and is at layer 1

Node C has a weight of 2 and is at layer 2

Node D has a weight of 1 and is at layer 3

Node E has a weight of 4 and is at layer 1

Node F has a weight of 16 and is at layer 0

Node G has a weight of 4 and is at layer 1

Another example that determines a very different DAG:

"Find me an Apple Watch in Rome. The maximum price is 500 euros. I prefer it to have A, B, C, D, E. But A is better than B, B better than C, D better than C."

Hard Constraints:

Type: Watch

Price: 500

City: Rome

District:

Features: [ ]

Preferences:

Features: ['A', 'B', 'C', 'D', 'E']

Relative Importance: ['A>B', 'B>C', 'D>C']

In this case, the nodes A, E, and D belong to the first layer, B to the second layer, and C to the third.

Node A has a weight of 4 and is at layer 0

Node B has a weight of 2 and is at layer 1

Node C has a weight of 1 and is at layer 2

Node D has a weight of 4 and is at layer 0

Node E has a weight of 4 and is at layer 0

Example of User Interaction Sequence Aimed at Refining User Needs and the Formal Problem Representation. This example also demonstrates the use of enhanced expressiveness involving the presence of Boolean formulas on preferences.

User: "I would like to find an apartment in New York City with outdoor space, a budget of 400K euros, in either Manhattan or Brooklyn."

In this scenario, Boolean variables are introduced, specifically, F_b, which is true if and only if the budget found is less than or equal to 400K euros, and F_s, which is true if and only if the listing includes outdoor space.

Initial representation:

Hard Constraints:

Type: Apartment

Price: F_budget

City: New York City

District: ['Manhattan', 'Brooklyn']

Features: [F_s]

F_s: "Outdoor space"

F_budget: Price<=400

Preferences:

Features: [ ]

Relative Importance: [ ]

AI Agent: "For outdoor space, are a terrace or garden acceptable? If so, do you prefer a terrace over a garden?"

User: "Yes, I prefer the terrace over the garden."

Advanced Second Representation:

Hard Constraints:

Type: Apartment

Price: F_budget

City: New York City

District: ['Manhattan', 'Brooklyn']

Features:

F_budget: Price<=400

Preferences:

Features: [Terrace, Garden]

Relative Importance: [Terrace>Garden]

AI Agent: "Do you want to find more solutions? For example, there might be solutions with a slightly higher budget; should I include that in the preferences?"

User: "Yes, thank you."

Hard Constraints:

Type: Apartment

Price:

City: New York City

District: ['Manhattan', 'Brooklyn']

Features: [ ]

Preferences:

Features: [Terrace, Garden, F_budget]

Relative Importance: [Terrace>Garden]

F_budget: Price<=400

AI Agent: "Are you interested in evaluating solutions not located in Manhattan or Brooklyn? There might be some very close by."

User: "Okay."

Hard Constraints:

Type: Apartment

Price:

City: New York City

District: [ ]

Features: [ ]

Preferences:

Features: [F_d, Terrace, Garden, F_b]

Relative Importance: [Terrace>Garden]

F_budget: Price<=400

F_district: Manhattan OR Brooklyn

AI Agent: "Is the area more important than the budget?"

User: "No, the budget is more important than the area."

Hard Constraints:

Type: Apartment

Price:

City: New York City

District: [ ]

Features: [ ]

Preferences:

Features: [F_d, Terrace, Garden, F_budget]

Relative Importance: [Terrace>Garden, F_budget>F_district]

F_budget: Price<=400

F_district: Manhattan OR Brooklyn

AI Agent: "Are you interested in terrace solutions that are not located in your preferred area?"

User: "Yes."

The sequence of refinements during user interaction is equivalent to the following unique user request: "I would like an apartment in New York City. Use s preferences: terrace, garden, budget, and area. For me, having the terrace is better than the garden; the terrace is more important than the area. Adhering to the budget is more important than the area."

Hard Constraints:

Type: Apartment

Price:

City: New York City

District:

Features: [ ]

Preferences:

Features: [F_budget, F_district, Terrace, Garden]

Relative Importance: [Terrace>Garden, Terrace>F_district, F_budget>F_district]

F_budget: Price<=400

F_district: District=Manhattan OR Brooklyn

Node Terrace has a weight of 4 and belongs to layer 0

Node Garden has a weight of 1 and belongs to layer 1

Node F_budget has a weight of 4 and belongs to layer 0

Node F_district has a weight of 1 and belongs to layer 1

Topological sorting: ['Terrace', 'F_budget', 'Garden', 'F_district']

Optimality score for the solution: ['Terrace', 'Garden', 'F_budget', 'F_district']: 10

Optimality score for the solution: ['Terrace', 'F_district']: 5

Optimality score for the solution: ['Terrace']: 4

Optimality score for the solution: ['Terrace', 'F_budget', 'F_district']: 9

Optimality score for the solution: ['Garden', 'F_district']: 2

Optimality score for the solution: ['Garden', 'F_budget']: 5

From this formal representation of the problem, it is possible to apply the weight assignment process 150 and initialize the weights as follows.

Terrace: 4

Garden: 1

F_budget: 4

F_district: 1

Assuming the admissible solutions that meet only the mandatory constraints or returned by process 200 contain the following features:

a) Terrace, 440K euro, Brooklyn b) Terrace, 410K euro, Queens c) Terrace, 400K euro, Manhattan d) Garden, 490K euro, Brooklyn e) Garden, 390K euro, Bronx By applying the process 300, which calculates the optimality scores for the admissible solutions, and assuming for simplicity that all solutions fall into a single batch of processing (process 301), the following optimality scores are obtained:

Optimality score for the solution: ['Terrace', 'Garden', 'F_budget', 'F_district']: 10

Optimality score for the solution: ['Terrace', 'F_district']: 5

Optimality score for the solution: ['Terrace']: 4

Optimality score for the solution: ['Terrace', 'F_budget', 'F_district']: 9

Optimality score for the solution: ['Garden', 'F_district']: 2

Optimality score for the solution: ['Garden', 'F_budget']: 5

Terrace [weight=4], 440K euro [weight=0], Brooklyn [weight=1]; optimality score=5

Terrace [weight=4], 410K euro [weight=0], Queens [weight=0]; optimality score=4

Terrace [weight=4], 400K euro [weight=4], Manhattan [weight=1]; optimality score=9

Garden [weight−1], 490K euro [weight=0], Brooklyn [weight−1]; optimality score=2

Garden [weight=1], 390K euro [weight=4], Bronx [weight=0]; optimality score=5

It is observed that such variable assignments relative to identified ad characteristics can in turn be represented through a preference-induced DAG, where the values of optimality scores (larger indicates a more preferred solution) implicitly represent the relative importance of the solutions to the user, based on the expressed preferences.

Applying the process 302 to the only batch of results with present optimality scores and null processing for process 303 (single available batch already ordered), the following list of optimal and sub-optimal solutions with associated optimality scores is obtained:

1. c) Terrace, 400K euro, Manhattan; optimality score=9
2. a) Terrace, 440K euro, Brooklyn; optimality score=5
3. e) Garden, 390K euro, Bronx; optimality score=5
4. b) Terrace, 410K euro, Queens; optimality score=4
5. d) Garden, 490K euro, Brooklyn; optimality score=2

At this point, the user can decide whether to proceed with selecting the optimal solution or any other result, having an awareness of what the market offers and the levels of optimality of the available solutions relative to their preferences. Once solution of interest is selected, they can decide to proceed with the automatic purchase or negotiation process 400 with the advertisement's author.

Process 400, in the case of a real estate advertisement that does not offer the possibility of immediate online purchase, could then send an automatically generated message using a language model through API or impersonating the user's registered access to the advertisement portal, composing the appropriate fields of the message submission form.

Example of application to an online search engine to obtain optimal search results according to mandatory Constraints and preferences, or anyway sorted by optimality score.

Query: "forecasts" value of "inflation" euro area ECB "end of 2024"

Terms in quotes signify, in most search engines, those for which the user requires a "match" or their presence in the expected results or are otherwise highlighted as particularly relevant for the user. In the context of results obtained from a widely recognized leading state-of-the-art search engine, also among the most used ones:

1a ECB, managers see stable rates. Eyes on forecasts . . .
https://www.focusrisparmio.com>news>interest-rates . . .
Dec. 12, 2023—The focus is then on possible clues about future easing, on forecasts . . . end of 2024 set at 2.5%. A . . .

2b Euro area inflation: the year-end rise does not
https://www.wallstreetitalia.com>Economy
Jan. 5, 2024—Euro area inflation: here's why the year-end rise is not worrying . . . end of 2024 and 1.5% at the end of 2025, for an annual average below % . . .

3c 2024: Scenarios and Prospects of financial markets
https://www.mps.it>ann>annual-outlook-2024
Dec. 19, 2023—➢ Euro area, inflation is slowing down at sustained rates, even . . . the Eurjpy exchange in area 150 by the end of 2024, with possibilities of . . .

4d Italy's inflation October 2023, the estimates from Intesa
https://www.soldionline.it>news>macroeconomics
Oct. 30, 2023—According to the economists forecasts from IntesaSanpaolo, inflation . . . end of 2024 and below 2% only from the 2nd quarter of 2025," they concluded . . .

5e ECB: from the current rates a substantial contribution to the drop
https://www.veritaeaffari.it>economy>ecb-from-rates . . .
Jan. 11, 2024—ECB: from the current rates a substantial contribution to the decrease in inflation . . . . The Treasury has time until the end of 2024 to convince the . . . Europe Ven . . .

6f Signs of stickiness from euro area inflation
https://prodottiequotazioni.intesasanpaolo.com> . . .
Feb. 1, 2024—EUR/USD remains just above 1.08 (in area 1.0810) caught between inflation data in the Eurozone above forecasts and supportive indications for . . .

7g Weekly Economic Monitor
https://www.osservatorioagromafie.it>2023/10
Oct. 27, 2023—Next week, October inflation data for the euro area and estimates of . . . Inflation forecasts, current year.

8 h CSC forecasts: +0.4% Italian GDP in 2023
https://www.assolombarda.it>center-studies>the-fore . . .
Mar. 25, 2023—CSC forecasts: +0.4% Italian GDP in 2023, +1.2% in 2024 . . . end of 2024. The TTF price would therefore settle well below . . .

9i 10 for 2024 Special Edition Market Pulse
https://www.gsam.com>ita>advisors>market-strategy
The economic forecasts come from Goldman Sachs Global Investment Research as of Dec. 11, 2023. "Core inflation in the United States" refers to the PCE . . .

10l The International Scenario
https://www.confindustria.it>report>highlights
For 2023, the latest ECB forecasts estimate inflation . . . end of 2024. Also considering this indication, the CSC scenario envisages . . .

11m Trends for the Next Decade|UBS Forecasts for the
https://www.ubs.com
Helping investors navigate the future. Discover the opportunities of the coming years. Find out how to position your portfolio for the Year Ahead 2024. Contact us now. Investment solutions. Custom solutions.

12n Mortgage transfer: save over E1000 in a
https://www.mutuisupermarket.it>news-mortgages>surr . . .
Sep. 26, 2023—Following the latest ECB decision, we have extrapolated the forecasts . . . . All told from here to the end of 2024, if the Futures forecasts . . .

13o Lagarde raises rates despite recession
https://www.riskcompliance.it>news>lagarde-raises-r . . .
Jun. 16, 2023—ANNUAL INFLATION IN EURO AREA MAY 2013—MAY 2023. Source . . . ECB has declared to reinvest until the end of 2024. Source: European Central . . .

14p Focus Italy Italy: expected sharp drop in inflation at
https://group.intesasanpaolo.com>newsroom
Oct. 30, 2023—reached 4.6% in September 2023, core ECB inflation should fall to 2.3% by the end of 2024, then settle around the threshold . . .

15q Weekly Economic Monitor
https://www.osservatorioagromafie.it>2023/10
Oct. 20, 2023—Inflation forecasts, current year. Inflation forecasts, next year. INDICES. Var. % y/y. IPCA. Core. ECB. Core ex. AEAT. IPCA ex . . .

16r Real estate market: short-term perspectives
https://www.avalonconsulting.it>site>2023/10
The decision was based on the observation of inflation data and the latest forecasts for the euro area, which . . . On inflation, in Italy the value . . .

The number shown next to each result refers to the relative ordering proposed by the search engine; the letter beside it uniquely identifies the result in the Sequence.

Query: "forecasts" value "inflation" euro area ECB "end of 2024"

Preferences: "core inflation", "ECB", "euro area"

A partial preference ordering can also be represented with a chain DAG: "core inflation">"ECB">"euro area" (meaning the presence of "core inflation" is preferred to "ECB", and the latter is preferred to "euro area").

The application of mandatory constraints determines that only 5 out of the 16 results previously presented by the state-of-the-art search engine would be shown to the user. Indeed, the words determining the fulfillment of the mandatory constraints, derived from the presence of double quotes in the user's query, are highlighted in bold; these terms are missing (in co-occurrence) in the search results not shown below.

Furthermore, the presence of user preferences and their partial ordering dictates the following order, following the application of the method object of the present disclosure, with the specified optimality weight next to each search result.

The directed acyclic graph determined by the user's preferences in this example is similar to the chain type in example b), where specifically, applying process 150:

"core inflation" node has weight 4 and is located in layer 0

"ECB" node has weight 2 and is located in layer 1

"euro area" node has weight 1 and is located in layer 2

Applying process 300 to the example, or processes 301, 302, and 202, the following optimality scores and overall ordering for the admissible search results are obtained (the number recalls the previous placement in the ranking of the state-of-the-art search engine and the letter uniquely identifies it):

14p Focus Italy: sharp drop in expected inflation
https://group.intesasanpaolo.com>newsroom Oct. 30, 2023—reached 4.6% in September 2023, core inflation in ECB should fall to 2.3% by the end of 2024, then stabilize around the threshold . . .

Contains preferences: ["core inflation", "ECB" ]

Optimality Score: 6

13o Lagarde raises rates despite the recession https://www.riskcompliance.it>news>lagarde-raises-r . . .

Jun. 16, 2023—ANNUAL INFLATION IN EURO AREA MAY 2013—MAY 2023. Source . . . ECB has declared to reinvest until the end of 2024. Source: European Central . . .

Contains preferences: ["euro area", "ECB" ]

Optimality Score: 3

5e ECB: current rates contribute substantially to the decrease https://www.veritaeaffari.it>economy>ecb-from-rates . . .

Jan. 11, 2024—ECB: from the current rates a substantial contribution to the decrease in inflation . . . The Treasury has time until the end of 2024 to convince the . . . Europe Ven . . .

Contains preferences: ["ECB" ]

Optimality Score: 2

10l The International Scenario https://www.confindustria.it>report>highlights

For 2023, indeed, the latest forecasts from the ECB estimate inflation . . . end of 2024. Also considering this indication, the CSC scenario envisages . . .

Contains preferences: ["ECB" ]

Optimality Score: 2

4d Inflation Italy October 2023, estimates from Intesa . . .

https://www.soldionline.it>news>macroeconomics

Oct. 30, 2023—According to forecasts from the economists at IntesaSanpaolo, inflation . . . end of 2024 and below 2% only from the 2nd quarter of 2025," they concluded . . .

Contains preferences: [ ]

Optimality Score: 0

Notice that the "optimal solution" or the search result with the highest score was positioned at the bottom of the ranking returned by the state-of-the-art search engine. Moreover, notice that this optimal result for the user is also the one that would contain the best answer to the user's latent question: "what will be the core ECB inflation value at the end of 2024?". The answer is contained in the excerpt: "core ECB inflation should fall to 2.3% by the end of 2024". This determines that the present disclosure also finds application in recent RAG or "retrieval augmented generation" methods, where, in this case, the present disclosure enhances the "retrieval" or recovery component to achieve hyper-personalization of the response that is as relevant as possible to the user's request.

Notice that it is possible through modern language models (LLMs) to automatically generate a directed acyclic graph representation of the user's preferences starting from the simple user question "what will be the core ECB inflation value at the end of 2024?", or train them to generate it optimally. This determines that a broader application of the present disclosure, even in contexts where preferences are automatically generated, whether induced by user phrases in natural language or generated by different, even more abstract, contexts, in order to optimize search results.

Process 1, as described and illustrated in the Figures, can be implemented, for example, in a system architecture or system 10 (FIG. 6) which may comprise at least one server 14, or a plurality of computing nodes/computers hosting a distributed architecture. For instance, the system may include multiple web servers, optionally connected to a load balancer, one or more database servers, potentially configured to support horizontal scalability, message queues hosted on a single computing node or multiple nodes, and worker processes deployed on one or more computing nodes. Server 14 may be connected via a wide-area network 18, such as the Internet, to servers or computing nodes hosting one or more websites, Search engines, and/or third-party databases. A plurality of terminals 12, such as user devices or third-party software systems, may be connected via network 18, optionally through a load balancer to distribute request traffic across multiple servers 14, or directly to a server 14, where the software package (s) necessary to execute Process 1 may be installed (e.g., one or more memories may have computer-readable instructions corresponding to software package(s) stored, which can be executed by one or more processors to execute Process 1).

In alternative implementations, the method could be entirely executed on a single computing node, represented by the user device, where both the client-side and server-side components, typically deployed on servers in a computing infrastructure (as shown in FIG. 6), might instead be installed for example locally on the user device.

What is claimed:

1. A method for determining personalized search results with respect to mandatory constraints and preferences on search criteria representable via a directed acyclic graph (DAG), wherein nodes of the DAG represent preferences, the method being implemented within or integrated with database management systems, including distributed and heterogeneous databases, or information retrieval systems, search engines, or, in general, information processing systems, through software packages installed on one or more computers, the method comprising:

collecting input from users or software systems, wherein the input includes unstructured input forms such as natural language or voice, or structured representations such as web/mobile interface modules or input from third-party systems:

transforming the inputs into the mandatory constraints and preferences on search criteria, wherein the search criteria is partially ordered and representable through the DAG;

determining weights for the search criteria using a function, and associating the weights with the nodes of the DAG to determine a partial ordering of such weights equivalent to an order of the DAG nodes, wherein any node at level "k" has a weight "w" such that a distance between the weight "w" and a combination of all or any finite subset of the weights of the nodes at levels below "k" satisfy properties, the level being defined by a topological order of the DAG;

determining search results that satisfy the mandatory constraints on the search criteria, wherein the methods, applicable in batch processing or real-time modes, include at least one of indexing, partial or full extraction of data from websites to gather partial or complete data from the search results, advertisements, or data resulting from queries to the information retrieval systems, third-party systems, or other computing sources, as well as queries to databases or local data repositories;

determining and associating an optimality score with the search results, based on presence of preferential elements representable, via the DAG, in the search results, wherein the optimality score with respect to preferences enables an ordering of the search results that ensures the at least two of the properties are satisfied, the at least two properties including (i) the search results with a highest score are equally optimal, and (ii) the search results with a same score are equivalent; and ordering and returning the search results that satisfy the mandatory constraints.

2. The method of claim 1, further comprising:

utilizing parallel processes for initializing the weights of the DAG, identifying the search results satisfying the mandatory constraints, determining the optimality scores, ordering the subsets of search results based on the optimality score, and overall ordering of the search results.

3. The method of claim 1, further comprising:

processing the input using at least one large language models to transform the input into a structured representation of the mandatory constraints preferences on the search criteria representable via the DAG.

4. The method of claim 1, further comprising;

receiving at least one of periodic reports or asynchronous notifications to notify a user or a system of the search results obtained up to a time of receiving the search results or of improvements or equivalence in optimality scores.

5. The method of claim 1, further comprising;

iteratively refining the mandatory constraints or preferences on the search criteria, wherein the refining is based on at least one of:

feedback received from a user or a system, or using at least one language model to understand requests, generate questions or refinement proposals.

6. The method of claim 1, further comprising:

performing automatic actions on the personalized search results, wherein the automatic actions include one or more of automatic purchase or automatic negotiation in chat systems.

7. The method of claim 1, wherein the nodes of the DAG represent preferences on at least one of formulas, inequalities, or negative preferences.

8. The method of claim 1, wherein the mandatory constraints and the preferences are expressed in natural language.

9. A system comprising:

one or more memories having computer-readable instructions stored therein; and one or more processors configured to execute the computer-readable instructions to:

collect input from users or software systems, wherein the input includes unstructured input forms such as natural language or voice, or structured representations such as web/mobile interface modules or input from third-party software systems;

transform the inputs into mandatory constraints and preferences on search criteria, wherein the search criteria is partially ordered and representable through a directed acyclic graph (DAG), wherein nodes of the DAG represent preferences;

determine weights for the search criteria using a function, and associate the weights with nodes of the DAG to determine a partial ordering of such weights equivalent to an order of the DAG nodes, wherein any node at level "k" has a weight "w" such that a distance between the weight "w" and a combination of all or any finite subset of the weights of the nodes at levels below "k" satisfy properties, the level being defined by a topological order of the DAG;

determine search results that satisfy the mandatory constraints on the search criteria, wherein methods, applicable in batch processing or real-time modes, include at least one of indexing or partial or full extraction of data from websites to gather partial or complete data from the search results, advertisements, queries to information retrieval systems, third-party systems, or other computing sources, as well as queries to databases or local data repositories;

determine and associate an optimality score with the search results, based on presence of preferential elements representable, via the DAG, in the search results, wherein the optimality score with respect to preferences enables an ordering of the search results that ensures the at least two of the properties are satisfied, the at least two properties including (i) the search results with a highest score are equally optimal, and (ii) the search results with a same score are equivalent; and order and return the search results that satisfy the mandatory constraints.

10. The system of claim 9, further comprising:

a database configured to store at least one of advertisements, the search results, general informational data, or the mandatory constraints and preferences.

11. The system of claim 9, further comprising:

a terminal connected via a wide area network to the one or more processors and including an interface configured to receive the input, display the search results, and facilitate user interaction with the system.

12. The system of claim 9, wherein the one or more processors are further configured to execute the computer-readable instructions to:

utilize parallel processes for initializing the weights of the DAG, identifying the search results satisfying the mandatory constraints, determining the optimality scores, ordering the subsets of search results based on the optimality score, and overall ordering of the search results.

13. The system of claim 9, wherein the one or more processors are further configured to execute the computer-readable instructions to:

process the input using at least one large language model to transform the input into a structured representation of the mandatory constraints preferences on the search criteria representable via the DAG.

14. The system of claim 9, wherein the one or more processors are further configured to execute the computer-readable instructions to:

receive at least one of periodic reports or asynchronous notifications to notify a user or a system of the search results obtained up to a time of receiving the search results or of improvements or equivalence in optimality scores.

15. The system of claim 9, wherein the one or more processors are further configured to execute the computer-readable instructions to:

iteratively refine the mandatory constraints or preferences on the search criteria, wherein the refining is based on at least one of:

feedback received from a user or a system, or using at least one language model to understand requests, generate questions or refinement proposals.

16. The system of claim 9, wherein the one or more processors are further configured to execute the computer-readable instructions to:

perform automatic actions on the search results, wherein the automatic actions include one or more of automatic purchase or automatic negotiation in chat systems.

17. The system of claim 9, wherein the nodes of the DAG represent preferences on at least one of formulas, inequalities, or negative preferences.

18. The system of claim 9, wherein the mandatory constraints and the preferences are expressed in natural language.

19. One or more non-transitory computer-readable media comprising computer-readable instructions, which when executed by one or more processors, cause the one or more processors to:

collect input from users or software systems, wherein the input includes unstructured input forms such as natural language or voice, or structured representations such as web/mobile interface modules or input from third-party software systems;

transform the inputs into mandatory constraints and preferences on search criteria, wherein the search criteria is partially ordered and representable through a directed acyclic graph (DAG), wherein nodes of the DAG represent preferences;

determine weights for the search criteria using a function, and associate the weights with nodes of the DAG to determine a partial ordering of such weights equivalent to an order of the DAG nodes, wherein any node at level "k" has a weight "w" such that a distance between the weight "w" and a combination of all or any finite subset of the weights of the nodes at levels below "k" satisfy properties, the level being defined by a topological order of the DAG;

determine search results that satisfy the mandatory constraints on the search criteria, wherein methods, applicable in batch processing or real-time modes, include at least one of indexing or partial or full extraction of data from websites to gather partial or complete data from the search results, advertisements, queries to information retrieval systems, third-party systems, or other computing sources, as well as queries to databases or local data repositories;

determine and associate an optimality score with the search results, based on presence of preferential elements representable, via the DAG, in the search results, wherein the optimality score with respect to preferences enables an ordering of the search results that ensures the at least two of the properties are satisfied, the at least two properties including (i) the search results with a highest score are equally optimal, and (ii) the search results with a same score are equivalent; and order and return the search results that satisfy the mandatory constraints.

20. The one or more non-transitory computer-readable media of claim 19, wherein the nodes of the DAG represent preferences on at least one of formulas, inequalities, or negative preferences; and the mandatory constraints and the preferences are expressed in natural language.

* * * * *